UNITED STATES PATENT OFFICE.

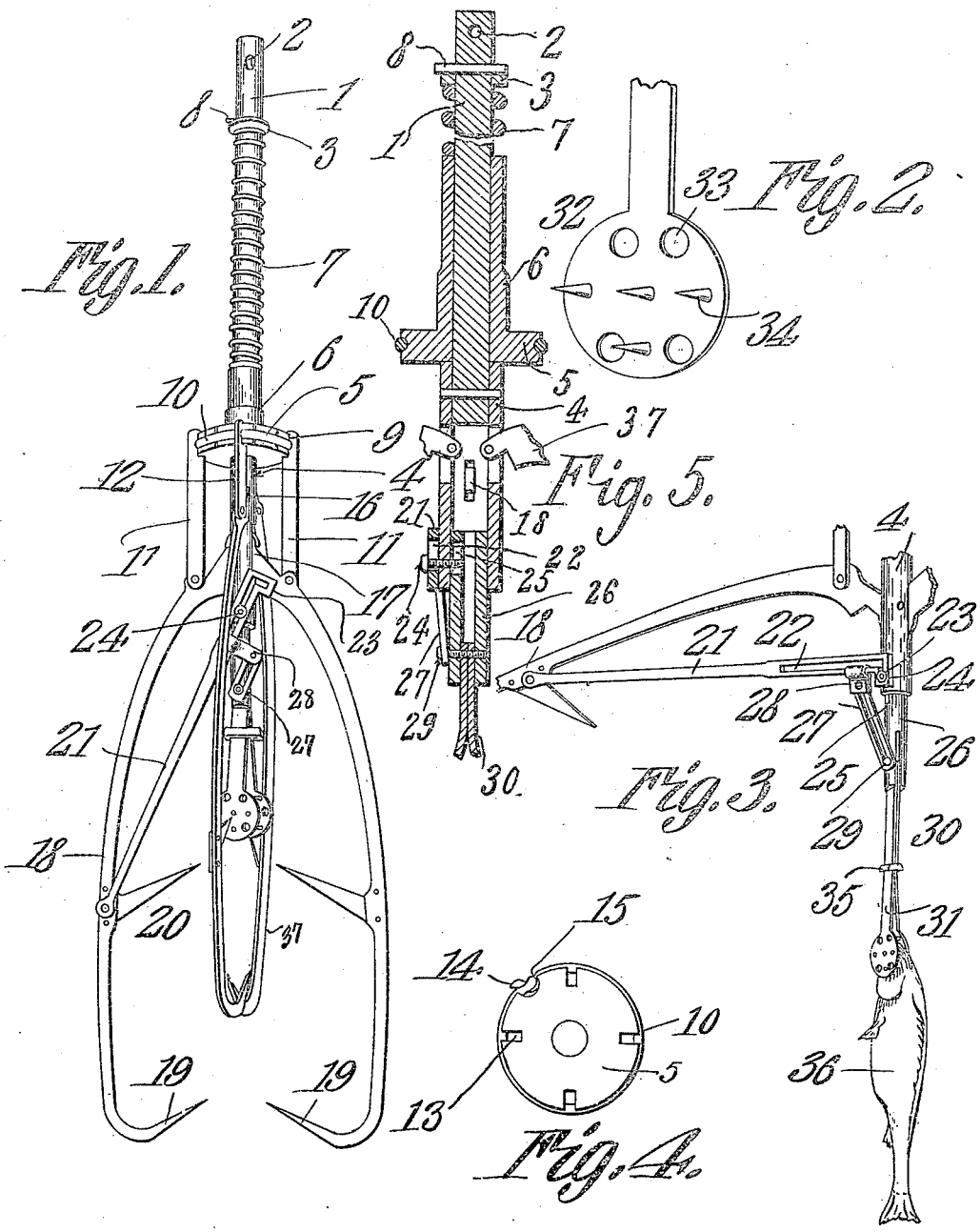

STEPHEN B. LEE, OF DANBURY, IOWA.

FISH AND GAME HOOK.

958,142.  Specification of Letters Patent. Patented May 17, 1910.

Application filed June 21, 1909. Serial No. 503,512.

*To all whom it may concern:*

Be it known that I, STEPHEN B. LEE, a citizen of the United States, residing at Danbury, in the county of Woodbury and State of Iowa, have invented a new and useful Fish and Game Hook, of which the following is a specification.

It is the object of this invention to provide a fish and game hook so constructed that when the animal attempts to seize the bait, the seizure of the bait will release a plurality of trapping arms, adapted to hold the animal securely between them.

Another object of the invention is to provide a novel means for setting the trapping arms of the device, and for tripping them, so that the animal may be engaged thereby.

With these and other objects in view, the invention consists in the novel construction and arrangement of parts hereinafter described, delineated in the drawings, and claimed, it being understood, that, since the drawings show but one form of the invention, changes, properly falling within the scope of what is claimed, may be made, without departing from the spirit of the invention.

Similar numerals of reference are employed to denote corresponding parts throughout the several figures of the drawings.

In the accompanying drawings,—Figure 1 shows my invention in perspective, the trapping arms being in the position which they will assume when the animal is engaged thereby; Fig. 2 is a fragmental perspective of the bait-clamp; Fig. 3 is a perspective showing the device in its distended or set position, parts being broken away; Fig. 4 is a top plan of the device, parts being removed; and Fig. 5 is a longitudinal section of the device, parts being shown in elevation.

In carrying out the invention, a stem 1, preferably circular in cross section, is provided, the stem having adjacent its upper end, an opening 2 into which the line may be inserted when the device is used for fishing. Secured to the lower end of the stem 1, is a tubular casing 4. Protruding from the stem 1, adjacent the opening 2, is a pin 8. A sleeve 6 is mounted for reciprocation upon the stem 1, between the pin 8, and the casing 4, this sleeve being provided with an outstanding disk 5. In order to actuate the sleeve 6 toward the casing 4, a spring 7 surrounds the stem 1, abutting, at its lower end, against the sleeve 6, and, at its upper end, against the washer 3, which, in its turn, abuts against the outstanding pin 8.

The periphery of the disk 5 is crossed transversely by a plurality of slots 13, of which, in the present instance, there are four, located at equal distances apart, around the periphery of the disk. The periphery of the disk 5 is provided with a circumscribing groove 9 adapted to receive a wire 10, extended through the upper extremities of arms 11 and 12, so that the said arms may be pivotally mounted in the slots 13. As shown most clearly in Fig. 4 of the drawings, the disk 5 is provided with a recess 15, adapted to receive the knot or union in the ends of the member 10, so that the said knot may be housed well within the periphery of the disk 5. The casing 4, below the disk 5, is provided with longitudinally disposed openings 16 and 17, alined with the slots 13. The openings 17 are disposed slightly below the openings 16, arms 18 being pivotally mounted in any desired manner in the openings 17, arms 37 being similarly mounted in the openings 16. The arms 18, which are somewhat longer than the arms 37, are provided, at their lower extremities, with inwardly projecting prongs 19, other prongs, denoted by the numeral 20, extending inwardly from the arms 18, intermediate the ends of the arms. By referring to Fig. 1 of the drawings, it will be seen that the prongs 19 and 20 which are carried by the arms 18, are duplicated upon the arms 37.

It will be noted that the members 12 are somewhat shorter than the members 11, the members 12 being pivotally connected, at their lower ends, with the arms 37, the members 11 being pivotally connected, at their lower ends, with the arms 18. In order to hold the several arms 18 and 37 into the open position shown in Fig. 3 of the drawings, a trigger bar 21 is provided, one end of which is pivotally secured to one of the arms 18, adjacent the prong 20 upon said arm. This trigger bar 21 terminates in a rectangularly disposed portion 23, the trigger bar being provided with a slot 22 extending longitudinally of the trigger bar, and into the rectangularly disposed portion 23 of the trigger bar, the slot 22 thus being angular in outline. Adjacent its lower end, the casing 4 carries a stud 24, which is adapted to reciprocate in the slot 22 of the trigger bar 21.

This stud 24 is adapted to register in a longitudinally disposed slot 25 in a tubular member 26, the tubular member 26 constituting a bait-supporting element. The tubular member 26 is therefore free to reciprocate to a limited extent in the casing 4.

A trip bar 27 is provided, the same having a longitudinally disposed slot adapted to receive a stud 29, in the form of a pin or the like, the member 29 being extended within the tubular member 26, to engage the bait-clamping member 30, the construction of which will be described in detail hereinafter. Pivotally secured to the upper extremity of the trip bar 27, is a sleeve 28, adapted to inclose a portion of the trigger bar 21, and to reciprocate in the slot 22 of the trigger bar.

The bait-clamping member, denoted generally by the numeral 30, comprises a pair of resilient arms 31, which are retained within the tubular member 26 by means of the element 29. These resilient arms 31, terminate at their lower ends, in disks 32, shown most clearly in Fig. 2 of the drawings. These disks 32 are provided with openings 33 and with outstanding pins 34, the construction being such that the pins 34, of one of the disks will register in the openings 33 in the other of the disks. In order that the disks 32 may be made to engage the bait 36, a clamping member, in the form of a ring 35, or the like, is adapted to reciprocate upon the resilient arms 31.

In practical operation, in order to set the device, the same is inverted from the position shown in Fig. 1 of the drawings. The arms 18, being longer than the arms 37, are preferably seized and swung apart, the members 11 and 12 causing the sleeve 6 to slide upon the stem 1, the spring 17 compressed in the process. As the arms are thus being swung apart, the stud 24 will move in the longitudinally disposed portion of the slot 22, and when the stud has moved to the end of the slot, the inner end of the trigger bar 21 will fall gravitationally, the stud 24 entering that portion of the slot 22 which is located in the portion 23 of the trigger bar. This operation will lock the arms in the position shown in Fig. 3 of the drawing.

When the animal seizes the bait 36, the tubular member 26 will move downwardly within the casing 4, the trip bar 27 drawing the inner end of the trigger bar 21 downwardly, so that the stud 24 will pass out of that portion of the slot 22 which is located in the portion 23 of the trigger bar 21. The several arms being thus unlocked, will move, under the impulse of the spring 7 to cause the several prongs 19 and 20 to engage and to hold firmly the animal which has seized the bait.

Although the device may readily be sprung by an animal attempting to seize the bait, it will be seen that when the device is inverted, the same may readily be baited without endangering the operator.

The device is intended primarily as a fish-taking structure, but it can readily be seen that the same may be employed for other purposes in which an efficient portable trap is required.

Having thus described my invention, what I claim as new and desire to protect by Letters Patent is:—

1. A device of the class described including a casing; a trapping arm pivotally secured to the casing; a stud outstanding from the casing; a trigger bar pivoted at one end to the arm and at the other end provided with a slot adapted to receive the stud slidably, and comprising angularly disposed portions, in one of which the stud is arranged to be engaged to hold the arm distended.

2. A device of the class described comprising a casing; a trapping arm pivotally secured to the casing; a stud outstanding from the casing; a trigger bar pivoted at one end to the arm and at the other end provided with a slot adapted to receive the stud slidably, and comprising angularly disposed portions in one of which the stud is arranged to be engaged to hold the arm distended; a bait-supporting element slidably mounted in the casing; and a trip bar pivotally connected with the trigger bar and the bait-supporting element, and operative to break the engagement between the stud and the trigger bar.

3. A device of the class described comprising a casing; a trapping arm pivotally secured to the casing; a stud outstanding from the casing; a trigger bar pivoted at one end to the arm and at the other end provided with a slot adapted to receive the stud slidably, and comprising angularly disposed portions in one of which the stud is arranged to be engaged to hold the arm distended; a bait-supporting element slidably mounted in the casing; and a trip bar pivotally connected with the trigger bar and with the bait-supporting element and operative to break the engagement between the stud and the trigger bar; the stud constituting a means for assembling the bait-supporting element with the casing.

4. A device of the class described comprising a casing; a trapping arm pivotally secured to the casing; a stud outstanding from the casing; a trigger bar pivoted at one end to the arm and at the other end provided with a slot adapted to receive the stud slidably, and comprising angularly disposed portions in one of which the stud is arranged to be engaged to hold the arm distended; a bait-supporting element slidably mounted in the casing; a trip bar pivotally connected with the bait-supporting element; and a sleeve slidably mounted upon the trigger bar in the slot thereof, and pivotally connected with the trip bar.

5. A device of the class described comprising a casing; a trapping arm pivotally secured at one end to the casing; a trigger bar pivotally secured at one end to the intermediate portion of the arm and at the other end slidably secured to the casing, the last named end of the bar being movable upon the casing in a common direction with the free end of the arm when the arm is swung into distended position, to lock the arm in distended position.

6. A device of the class described comprising a casing; a trapping arm pivotally secured at one end to the casing; a trigger bar pivotally secured at one end to the intermediate portion of the arm and at the other end slidably secured to the casing, the last named end of the bar being movable upon the casing in a common direction with the free end of the arm when the arm is swung into distended position, to lock the arm in distended position; a bait-supporting device slidably mounted in the casing; and means operatively connecting the bait-supporting device with the bar to dislodge the bar from locked position.

7. In a trap of the class described, the combination with an elongated stem having a transverse pin at its upper extremity and a slotted offset portion at its lower extremity, of radiating trapping arms pivotally secured in said slots, a sleeve reciprocating between said offset portion and said transverse pin, attached to said trapping arms by a series of operating members, said operating members being of alternating lengths, and means for setting and releasing said arms.

8. In a trap of the class described the combination with a stem having at its lower extremity a series of trapping arms, and a stud projecting below said arms, of a sleeve reciprocating on the upper portion of said stem adapted to expand said trapping arms, a spring adapted to keep said arms in a contracted position operated against said sleeve, means for setting said arms in an expanded state comprising a trip rod pivotally secured to one of said arms and having an angular slot in its opposite extremity in which said stud reciprocates, a bait-clamping member and means operated by the bait clamping member for releasing said rod and allowing the arms to return to their contracted position.

In testimony that I claim the foregoing as my own, I have hereto affixed my signature in the presence of two witnesses.

STEPHEN B. LEE.

Witnesses:
LOUIS LARSON,
J. H. CRILBY.